United States Patent [19]

Treger

[11] Patent Number: 5,091,272

[45] Date of Patent: Feb. 25, 1992

[54] SEPARATOR FOR ELECTROCHEMICAL CELLS

[75] Inventor: Jack Treger, Milton, Mass.

[73] Assignee: Duracell Inc., Bethel, Conn.

[21] Appl. No.: 530,149

[22] Filed: May 29, 1990

[51] Int. Cl.⁵ .......................... H01M 2/16; B05D 5/00
[52] U.S. Cl. ...................................... 429/62; 429/145; 427/195; 427/243; 427/430.1
[58] Field of Search ................. 427/62, 145; 427/195, 427/243, 430.1, 434.5, 62, 145

[56] References Cited

U.S. PATENT DOCUMENTS

| | | | |
|---|---|---|---|
| 2,668,787 | 2/1954 | Schramm | 427/243 X |
| 3,186,886 | 6/1965 | Etchison et al. | 427/243 |
| 4,075,400 | 2/1978 | Fritts | 429/62 |
| 4,562,094 | 12/1985 | Goebel et al. | 427/243 X |
| 4,650,730 | 3/1987 | Lundquist et al. | 429/62 |
| 4,731,304 | 3/1988 | Lundquist et al. | 429/62 |
| 4,741,979 | 5/1988 | Faust et al. | 429/249 X |
| 4,973,532 | 11/1990 | Tasker et al. | 429/62 |

*Primary Examiner*—Stephen J. Kalafut
*Attorney, Agent, or Firm*—Ronald S. Cornell; James B. McVeigh, Jr.

[57] ABSTRACT

This invention relates to a heat sensitive polymer film and to a method for making the same. The film becomes substantially impermeable to air or ion flow above a predetermined temperature and is useful as a separator in electrochemical cells. The film comprises a microporous layer coated on at least one side with a layer of heat-fusible polymer particles.

24 Claims, 2 Drawing Sheets

SEPARATOR FOR ELECTROCHEMICAL CELLS

This invention relates to a heat sensitive separator for electrochemical cells and to a method for making the same.

The design of high energy density electrochemical cells often includes safety features which, during abuse conditions such as a short circuit, can safely control the otherwise sudden release of the energy stored. One such feature is a heat sensitive separator which responds to the heat generated during abuse by becoming less porous and thereby reducing the electric current which can flow through the cell.

U.S. Pat. No. 4,075,400 discloses a separator which comprises a poisoning agent encapsulated in a material which melts at a predetermined temperature. The poisoning agent deactivates the electrodes when it is released when the encapsulant melts. The separator structure is a non-woven mat which is generally thicker than is desired for high energy density cells.

U.S. Pat. Nos. 4,650,730 and 4,731,304 both disclose a heat sensitive separator which is comprised of two microporous layers bonded together. One of the microporous layers is made from a polymer which melts at a lower temperature than the other layer. When the layer melts it closes off its own pores and reduces the current which can flow through the cell.

U.S. Pat. No. 4,741,979 discloses a separator made from wax coated fibers. The wax melts at a predetermined temperature and blocks off the pores between the fibers.

Japanese Kokai 60-52 discloses a non-woven fibrous separator which has a polyethylene powder dispersed among the fibers.

An object of the present invention is to provide a heat sensitive separator which is simple to manufacture and which is thin enough for use in a high energy density electrochemical cell.

The features and advantages of the present invention will be described with reference to the figures in which.

Figure 1:
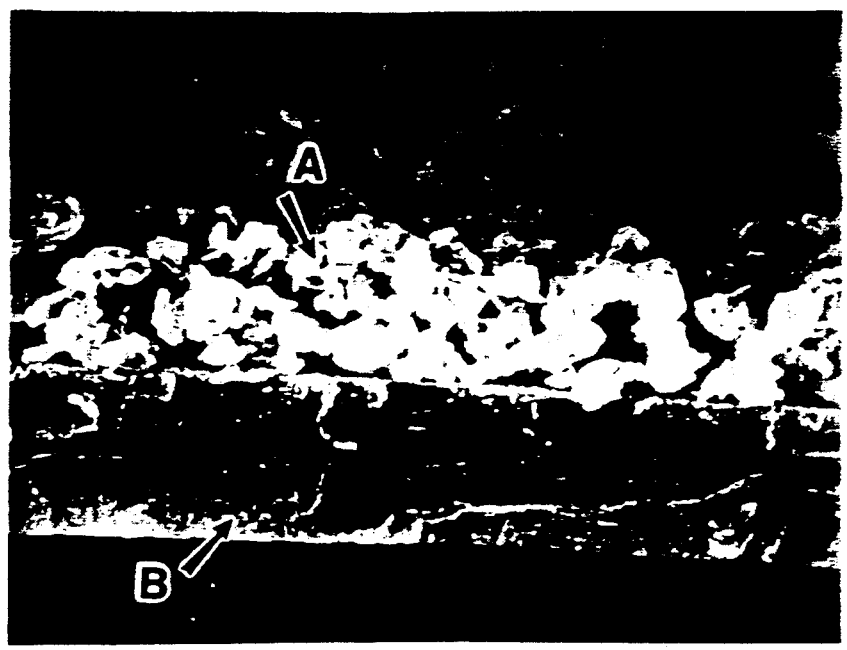
FIG. 1 is a cross sectional photomicrograph (1000X) through a heat sensitive polymer film made in accordance with the present invention.

The present invention is a porous, heat sensitive polymer film comprising a microporous layer having a melting point of at least about 80° C. and a layer of heat-fusible, polymer particles coated on at least one side of the microporous layer, said particles having a melting point less than the melting point of the microporous layer. FIG. 1 shows a cross-sectional micrograph (1000x magnification) through a heat sensitive polymer film made in accordance with the present invention. The particle layer is designated by the letter "A" and the microporous layer is designated by the letter "B".

Figure 3:
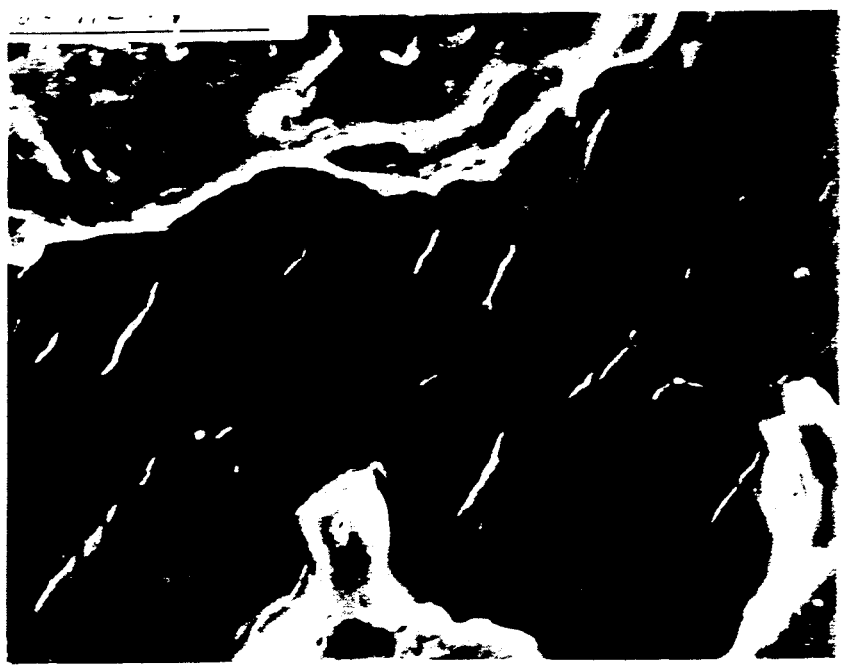
FIG. 3 is a photomicrograph (2000X) looking downwardly onto a heat sensitive separator made in accordance with the present invention in which the particle layer has melted.

The heat sensitive polymer film preferably further comprises means for binding the particles to each other and for binding the particles to the microporous film. When the heat sensitive film is exposed to a temperature above the melting point of the particles the particles melt and render the film substantially impermeable to air or ion flow. FIG. 3 shows a photomicrograph of a heat sensitive film, prepared in accordance with the present invention, that has been heated above the melting point of the particles.

The microporous layer can be made from a material selected from the group consisting of polyhalohydrocarbons, polyolefins, and copolymers of ethylene and vinyl acetate Examples of suitable polyhalohydrocarbons include polytetrafluoroethylene, copolymers of ethylene and tetrafluoroethylene, and copolymers of ethylene and chlorotrifluoroethylene. It is preferred that the microporous layer is made from a polyolefin selected from the group consisting of polypropylene (melting point (MP)=160° C.), high density polyethylene (MP=130° C.), polybutene (MP=120° C.), and mixtures thereof or from a lower melting material such as ethylene vinyl acetate (MP=80° C.). The void volume of the microporous layer should be at least about 30% in order to permit high discharge currents to be drawn from the cell without undue voltage polarization. The thickness of the microporous layer should not be greater than about 3 mils because the added thickness occupies space which could otherwise be filled with active material. The practical lower limit on thickness is about 0.2 mils because the microporous layer needs a certain amount of mechanical strength and because a thinner separator can be readily punctured by sharp edges on the electrodes resulting in a short circuit. Non-limiting examples of suitable microporous films for use in the present invention include Celgard (Registered Trademark - Celanese Corporation) 2400 which is a 1 mil thick polypropylene film with about 35% void volume, Celgard (TM) 2500 which is a 1 mil thick microporous polypropylene film with about 45% void volume, and Celgard (TM) K880 which is a 1.5 mil thick microporous high density polyethylene film with about 56% void volume. Microporous films generally have pore sizes less than about 100 microns. It is preferred that the pore size is less than 10 microns and it is most preferred that the pore size is less than 1 micron.

The heat-fusible, polymer particles are preferably made from a material which melts below the melting point of the microporous layer. The lower limit for the melting point of the particles is about 60° C. because an electrochemical cell can be exposed to this temperature during normal use such as storage in a glove compartment on a hot summer day. However, it is preferred that the particles will melt in the range of between about 80° C. and 120° C. and it is most preferable that the particles will melt between about 90° C. and 110° C. These ranges will ensure that the cell will be shut down while at a safe temperature.

The melt viscosity of the particle material has an effect on the time it takes for the particles to melt and close the pores of the microporous film. It is preferred that the melt viscosity of the material should be less than about 500 cps, and more preferably less than 50 cps, and most preferably less than 10 cps. Such a viscosity is sufficiently low that the melted polymer tends to flow into the pores of the microporous layer. This is the preferred mode of shut down of the separator. However, materials with a melt viscosity greater than about 500 cps are operable but they tend to shut down the separator in a different mode. Rather than flowing into the pores, these materials tend to melt and fuse into an impermeable layer on the surface of the microporous layer without significant pore penetration. This is a slower process than the preferred mode discussed above.

Suitable materials having the desired melting point and melt viscosity include, but are not limited to, petroleum waxes such as paraffin wax and microcrystalline wax; natural waxes such as carnauba, jojoba, candelilla, Japan wax, ouricuri, beeswax, shellac wax, spermaceti wax, rice bran wax, and castor wax; mineral waxes such as montan, ozocerite, ceresin, and peat; synthetic waxes such as polyethylene, oxidized polyethylene, and Fisher-Tropsche; fatty acids; fatty alcohols; fatty amides; fatty esters; and ethylene copolymers such as ethylene-vinyl acetate, ethylene-acrylate, and ethylene-acrylic acid.

Of the above materials, the most preferred are those which have a very narrow range of molecular weight distribution because they have a very sharp melting point. Thus, waxes which have a broad range of molecular weight distribution are undesirable, particularly if there is some very low molecular weight fractions. These fractions are likely to be soluble in the non-aqueous electrolytes used in lithium cells and this solubility can cause adverse cell reactions. Non-limiting examples of preferred materials include POLYWAX (TM) polyethylene waxes made by Petrolite Specialty Polymers Group such as Polywax 500 (MP=86° C.), Polywax 655 (MP=102° C.), Polywax 1000 (MP=113° C.), and Polywax 2000 (MP=125° C.). These materials are crystalline waxes with very sharp melting points.

Figure 4:
FIG. 4 is a cross sectional photomicrograph (750X) through an alternate embodiment of a separator made in accordance with the present invention.

The shape of the particles is not critical but it is preferred that the particles are either spherical or irregular (See FIGS. 1 and 4). These shapes ensure that the particles will pack in the layer in such a way that there is sufficient porosity in the layer so that, in a preferred embodiment, the air permeability of the heat sensitive film is about the same as the air permeability of the microporous layer alone. Thus, an advantage of the present invention is that the heat sensitive component does not reduce the air permeability of the final film. However, if the particles are of extremely small size they can pack in such a manner that the air permeability of the film is less than that of the microporous layer. For practical cell operation, the air permeability of the heat sensitive film should not be less than about 50% of the air permeability of the microporous layer.

The size of the heat-fusible particles should be between 0.1 and 100 microns. If the particles were smaller than 0.1 microns they would have a tendency to block the pores of the microporous layer and reduce permeability. It is preferred that the particles are large enough so that they actually rest on the surface of the microporous layer. However, if the particles are too large, for example greater than 100 microns, it is not possible to obtain multiple layers of particles in a thin layer. Multiple layers of particles are desirable because the close packed structure has a high packing density and provides more rapid shut down of the heat sensitive film when the particles melt. It is preferred that the particles have an average size of between about 1 and 15 microns. This size allows for stacking between 3 and 50 particles in a layer that is 1 mil thick.

As discussed above, it is preferred that the particle material has a melt viscosity sufficiently low so that the melted polymer flows into and fills the pores of the microporous layer. Thus, the amount of particles to be coated on the surface area of the microporous layer is related to the void volume of the microporous layer. The volume of particle material to be coated per square area of the microporous layer should be sufficient to fill the void volume in the same square area of the microporous layer. The amount of particles needed is calculated as follows. The volume of the microporous layer ($cm^3$) multiplied by the percent of voids gives the actual volume of the voids ($cm^3$), which is also the desired volume ($cm^3$) of particle material. Multiplying the desired volume of particle material ($cm^3$) by the actual density of the particles ($g/cm^3$) gives the mass, in grams, of the particles needed to be coated over the entire surface area of the microporous layer. Dividing the grams of particles by the surface area of the microporous layer ($cm^2$) gives the grams of particles needed per $cm^2$ of the microporous layer.

Figure 2:
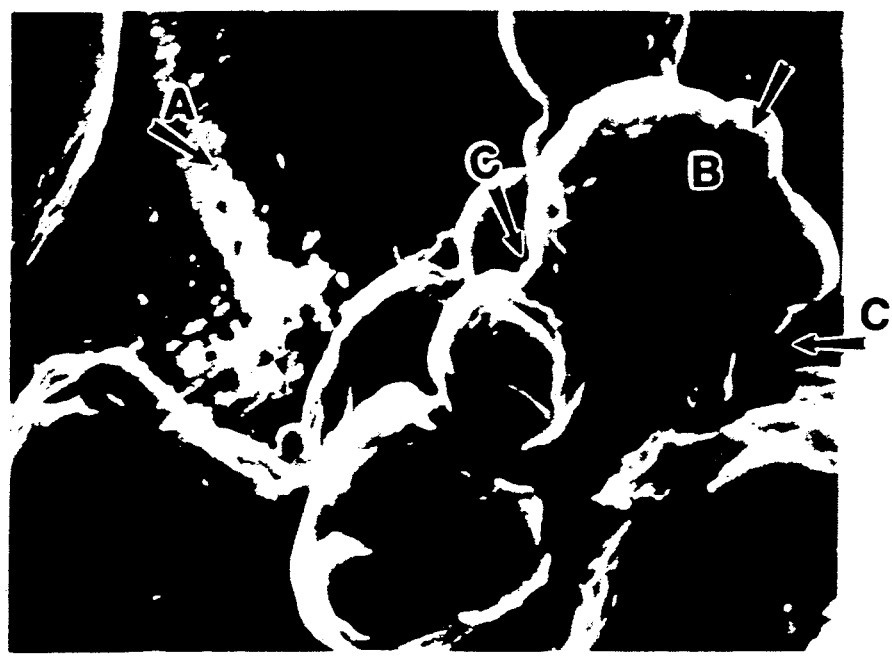
FIG. 2 is a photomicrograph (4000X) looking downwardly through the particle layer of a separator made in accordance with the present invention.

It is preferred that the heat sensitive separator further includes means for binding the particles to each other as well as for binding the particles to the microporous layer. A coherent, flexible structure is desirable so that the separator can be easily handled without the particles coming loose. One embodiment comprises partially melting the particles after the particle layer is applied so that the particles fuse together as well as fuse to the microporous layer. A more preferred embodiment comprises mixing a small percentage (about 10–15% by weight; of low melting point particles with the desired heat sensitive polymer particles. After the the particle mixture is applied as a layer the low melting point particles are melted which then both binds the heat sensitive polymer particles together and to the microporous layer. The separator cross section shown in FIG. 4 was made using this method and will be disscussed more fully below. The most preferred means is an adhesive. FIG. 2 shows a heat sensitive separator that has an adhesive, designated "C", which binds the particles, designated "B", together and which binds the particles to the microporous film, designated "A".

The adhesive must be capable of both binding the particles together and binding the particles to the microporous film. The adhesive should be used in an amount sufficient to bind the particles together without being excessive so as to encapsulate the particles or to block the pores of the microporous layer. It has been found that the amount of dry weight of adhesive should be at least 2% of the weight of particles to get good binding and not more than 10% of the weight of the particles to prevent encapsulation.

The adhesive should not be soluble in the electrolyte, otherwise the separator structure would disintegrate. As discussed further below, the adhesive should be soluble in a solvent used to prepare a suspension which suspension is used to apply the particles and adhesive to the microporous layer.

Insolubility in the electrolyte is achieved by using an adhesive which can be cross-linked or an adhesive with a solubility parameter below 8 hildebrands. Non-limiting examples of cross linkable adhesives include acrylic copolymers, carboxylic copolymers, urethane copolymers, ethylene vinyl acetate carboxylic acid terpolymers, silicone rubbers, nitrile rubbers, and neoprene. Non-limiting examples of adhesives with low hildebrand solubility parameters include natural rubber, butyl rubber, polyisobutylene, styrene-butadiene, silicone, styrene-isoprene, and polysulfide.

A preferred class of adhesives is acrylic copolymers with a high degree of tack. Preferably the acrylic copolymer has a glass transition temperature less than the melting point of the particles, more preferably less than room temperature, and most preferably less than 0° C.

A method for preparing a heat sensitive separator in accordance with the present invention involves preparing a suspension comprising a volatile solvent, heat-fusible polymer particles, and an adhesive that is soluble in the solvent; passing a microporous film into the suspension; removing the microporous film upwardly out of the suspension whereby a uniform coating of the suspension is on both sides of the microporous film; and evaporating the solvent from the coated suspension. Preferably, the coated suspension is removed from one side of the microporous film before the solvent is evaporated so that the resultant heat sensitive separator has particles coated only on one side.

If the adhesive is self cross-linking, the method preferably further includes cross-linking the adhesive by heating the separator after the solvent is removed for period for time sufficient to effect cross linking.

The method described is easily adapted to be a continuous process whereby the microporous layer is fed from a reel, passed through the suspension bath, dried, and then wound up on a take up reel.

The solvent for making the suspension must be capable of dissolving the adhesive and suspending the heat fusible particles. The latter is achieved by choosing a solvent which has a similar specific gravity as the particles. The solvent should also be volatile so that it can easily be removed from the suspension-coated microporous layer. Non-limiting examples of suitable solvents include $C_1$ to $C_4$ ketones such as acetone and methylethyl ketone; $C_1$ to $C_4$ esters such as methyl acetate, ethyl acetate, and butyl acetate; $C_1$ to $C_4$ ethers such as dimethyl ether, diethyl ether, and dibutyl ether; aromatics such as benzene and toluene; and halogenated solvents such as carbon tetrachloride, chloroform, and methylenechloride. Of these, ketones are preferred because they do not dissolve the particles and they are safe from an environmental and health perspective.

The viscosity of the suspension determines the thickness of the coating that is applied to the microporous layer as it is drawn out of the suspension. Thus, once the amount of particles per area of the microporous layer is calculated as described above the desired thickness of the particle layer is obtained by adjusting the viscosity of the suspension bath. The relationship between viscosity and thickness will change depending on the nature of the adhesive, the solvent, and the particles. Example 7, described below gives the relationship between viscosity and particle layer thickness for some preferred materials.

The features and advantages of the present invention are demonstrated in the following examples.

EXAMPLE 1

A suspension is prepared by dissolving 42 g of a 40 wt % solution of acrylic copolymer self-cross linking adhesive (Monsanto Gelva RA784) in 1300g acetone. While stirring this solution, 340g of polyethylene wax having a melting point of 113° C., a molecular weight of 1000, and an average particle size of 6 microns (Petrolite Polywax(TM) 1000-T6) is added. The composition of the resultant suspension is 77% acetone, 20% polyethylene wax, and 3% of the adhesive solution. The suspension has a Brookfield viscosity of 97 cps using a RV1 spindle at 20 RPM.

A 1 mil thick microporous polypropylene film (Celgard(TM) 2500) is passed from a feed reel into the suspension and then removed upwardly at a rate of ten ft/min. The wet suspension is removed from one side of the microporous layer using a wiper blade. The wet suspension coating on the other side is dried using a hot air dryer. The product is a heat sensitive separator having a 1 mil coating of polyethylene wax particles on a 1 mil microporous layer (see FIGS. 1 and 2). The dried separator is wound on a take up reel. The roll of separator is then placed in an oven at 7° C. for 5 hours to effect cross linking of the adhesive.

The heat sensitive separator has an air permeability of 30 seconds/10 cc/0.25 $in^2$ using ASTM method D726. By way of comparison, the Celgard 2500 microporous film alone was a permeability of 30 seconds/10 cc/0.25 $in^2$).

EXAMPLE 2

A heat sensitive separator made in accordance with Example 1 is heated while measuring its resistance in a test electrolyte. The test electrolyte is 1M lithium trifluoromethane sulfonate(LiTFS) in a mixture of propylene carbonate/ dimethoxydiethyl ether (2/1). A piece of separator is placed between two platinum electrodes (1 $cm^2$ each) in a glass conductivity cell. The resistance is measured using a 1 kilohertz AC signal. The conductivity cell is then placed into an oven and the temperature of the oven is slowly increased. When the oven temperature reaches 105° C. the resistance begins to increase and at 110° C. the resistance increases by more than 1000 times, indicating that the particles have melted and closed the pores of the microporous layer.

By way of comparison a piece of Celgard 2500 tested alone does not show any change in resistance until the temperature reaches about 160° C.

EXAMPLE 3

A 2/3A size lithium manganese dioxide cell is made using a heat sensitive separator made in accordance with Example 1. The electrodes are spirally wound together w.th the separator therebetween. The cell is filled with an electrolyte comprising 1M LiTFS propylene carbonate/ dimethoxydiethyl ether. The cell is heated from room temperature to 130° C. at 5° C./min while discharging the cell at a constant current of 0.25 amps. The voltage of the cell remains between about 2.8 to 3 volts until the temperature reaches 100° C. and the voltage begins to drop. The voltage drops to 0 volts at 105° C. indicating that the heat sensitive separator has become highly resistive.

By way of comparison, a cell having a separator consisting of microporous polypropylene would continue to pass 0.25 amps until the polyproplyene melted around 160° C.

EXAMPLE 4

A 2/3A size lithium/ manganese dioxide cell is made as described in Example 3. This cell is short circuited by connecting a wire between the positive and negative terminals. The initial short circuit current is about 6 amps and the temperature of the cell begins to rise. After 2 minutes the cell temperature peaks around 104° C. At the same time there is a sudden drop in current to about 0.15 amps. The temperature drops to about 65° C. after 1 hour and the cell slowly discharges itself.

By way of comparison a short circuited cell having a separator of only Celgard 2500 (TM) continues to heat until the temperature reaches around 160° C.

EXAMPLE 5

A heat sensitive separator is made following the procedure set forth in Example 1 but substituting a different polyethylene wax. A polyethylene wax having a melting point of 102° C., an average molecular weight of 700, and a particle size of 6 microns (Petrolite Polywax (TM) 655) is used. The suspension has a viscosity of 97 cps and results in a 1 mil coating of particles on the microporous layer.

The heat sensitive separator has an air permeability of 30 seconds/10 cc/0.25 in$^2$.

EXAMPLE 6

A separator made in accordance with Example 5 is tested in a conductivity cell as described in Example 2. The resistance across the separator increases by three orders of magnitude between 88° C. and 95° C.

EXAMPLE 7

This example demonstrates the effect of the suspension viscosity on the thickness of the particle coating.

Three suspensions are made in accordance with Example 1 but each uses a different amount of acetone. The Table listed below shows how the coating thickness varies with viscosity (Brookfield, RV1 Spindle, 20 RPM):

| Viscosity | Coating Thickness (mils) |
|---|---|
| 80 cps | 0.8 |
| 92 cps | 0.9 |
| 130 cps | 1.3 |

(Other waxes and adhesives may give different thicknesses for these same viscosities.)

EXAMPLE 8

This example demonstrates the use of a lower melting wax as the adhesive for binding higher melting wax particles.

A suspension is prepared by dissolving 42 g of a 40 wt % solution of acrylic copolymer non-cross linking adhesive (Monsanto Gelva RA788, this adhesive is electrolyte soluble and only holds the particles together long enough so that the lower melting wax can be melted) in 1300 g acetone. While stirring this solution, 340 g of a mixture of polyethylene waxes is added. The mixture is 85 wt % of a polyethylene wax having a melting point of 95° C. and a particle size of 20 microns (USI, FN510) and 15 wt % of a polyethylene wax having a melting point of 89° C. and a particle size of 6 microns (Petrolite Polywax 655).

A strip of Celgard 2500 is passed into the suspension and then removed upwardly out of the suspension. The wet coating is removed from one side using a wiper blade. The wet coating on the other side is dried below 85° C. using a hot air gun. The coated separator is then heated at 90° C. to melt lower melting wax and bind the other wax particles together. FIG. 4 shows a photomicrograph through the resultant separator.

A strip of separator made as described is immersed in an electrolyte comprising 1M LiTFS propylene carbonate/ dimethoxydiethyl ether and does not degrade even though the acrylic adhesive is soluble in the electrolyte.

A heat sensitive separator made as described has an air permeability of 30 sec/10cc/0.25 in$^2$. After heating this separator to 100° C. the air permeability exceeds 1000 sec/10 cc/0.25 in$^2$ indicating that the wax particles have melted and closed off the microporous layer.

The previous examples are for illustrative purposes only. It is understood that variations can be made to the specific examples in accordance with the teachings contained herein and still remain within the scope of the invention as claimed.

What is claimed is:

1. A porous, heat sensitive polymer film comprising a microporous layer comprising a polymer with a melting point of at least about 80° C.; a layer of heat-fusible, polymer particles coated on at least one side of the microporous layer, said particles having a melting point less than the melting point of the microporous layer; and means for binding the particles to each other and to the surface of the microporous film; wherein the heat sensitive polymer film becomes substantially impermeable above the melting point of the particles.

2. The heat sensitive polymer film of claim 1 wherein the microporous layer has a void volume of at least 30%, and wherein the polymer material in the particle layer has volume sufficient to fill the void volume of the microporous layer when the particles melt.

3. The heat sensitive polymer film of claim 1 wherein the polymer material in the particle layer has a volume sufficient to form a non-porous layer over the surface of the microporous layer when the particles melt.

4. The heat sensitive polymer film of claim 1 wherein the microporous layer has a thickness of between about 0.2 and 3 mils, the particle layer has a thickness of between 0.2 and 3 mils, and said particles have an average particle size of between 0.1 and 100 microns; and wherein the air permeability of the heat sensitive polymer film is no less than 50% of the air permeability of the microporous layer alone.

5. The heat sensitive polymer film of claim 1 wherein the means which binds the particles together and to the microporous layer is an adhesive.

6. An electrochemical cell comprising an anode, a cathode, a separator, and an electrolyte; wherein said separator is a heat sensitive separator comprising a microporous layer comprising a polymer having a melting point of at least about 80° C.; a layer of heat-fusible, polymer particles coated on at least one side of the microporous layer, said particles having a melting point of between about 60° C. and the melting point of the microporous layer and said particles are substantially insoluble in the electrolyte; and means for both binding the particles to each other and to the surface of the microporous film; wherein the heat sensitive separator becomes substantially impermeable to ion flow when heated above the melting point of the particles.

7. The cell of claim 6 wherein the microporous layer is made from a material selected from the group consisting of polyolefins, polyhalohydrocarbons, copolymers of ethylene and vinyl acetate, and mixtures thereof.

8. The cell of claim 6 wherein the particles comprise a material selected from the group consisting of petroleum wax, natural wax, mineral wax, synthetic polyethylene wax, fatty acids, fatty alcohols, fatty amides, fatty esters, ethylene copolymers, and mixtures thereof.

9. The cell of claim 6 wherein the particles comprise a material having a melt viscosity below 500 cps.

10. The cell of claim 6 wherein the means for binding the particles together and to the microporous layer is an adhesive.

11. The cell of claim 10 wherein the adhesive is self cross-linking.

12. The cell of claim 10 wherein the adhesive has a glass transition temperature below room temperature.

13. The cell of claim 10 wherein the amount of adhesive is between about 2 and 10 wt % of the particles.

14. The cell of claim 6 wherein the microporous layer has a thickness of between about 0.2 and 3 mil, the particle layer is substantially continuous and has a thickness of between 0.2 and 3 mils, and said particles have an average particle size of between 0.1 and 100 microns.

15. The cell of claim 14 wherein the air permeability of the heat sensitive film is about the same as the air permeability of the microporous layer alone.

16. The cell of claim 15 wherein the microporous layer is a microporous polyolefin film having a void volume of at least 30%; wherein the particles comprise polyethylene wax; and wherein the volume of the polyethylene wax in the particles is at least the same as the void volume of the microporous layer.

17. The cell of claim 16 wherein the polyethylene wax particles have a particle size of between about 1 and 15 microns and the layer of particles is between about 1 and 2 mils thick.

18. The cell of claim 17 wherein the means to bind the particles together and to each other is an acrylic copolymer having a glass transition temperature below room temperature.

19. A method for preparing a heat sensitive polymer film comprising preparing a suspension containing a volatile solvent, heat-fusible polymer particles which are insoluble in the solvent, and an adhesive which is soluble in the solvent; dipping a microporous film into the suspension; removing the microporous film upwardly out of the bath whereby a substantially uniform coating of the suspension is applied to at least one side of the microporous film; removing the solvent from the suspension coatings; and adhering the particles to each other and to the microporous film.

20. The method of claim 19 further comprising removing the wet suspension from one side of the microporous layer before the solvent is removed from the suspension coating on the other side.

21. The method of claim 19 wherein preparing the suspension comprises dissolving the adhesive in a solvent and adding the particles to the adhesive solution while mixing.

22. The method of claim 19 wherein adhereing the particles to each other and to the microporous film comprises cross linking the adhesive by heating below the melting point of the particles.

23. The method of claim 19 wherein the solvent is selected from the group consisting of $C_1$ to $C_4$ ketones; $C_1$ to $C_4$ esters; $C_1$ to $C_4$ ethers; aromatics; and halogenated solvents.

24. The method of claim 23 wherein the suspension has a viscosity of between about 80 and 130 cps at room temperature.

* * * * *